(12) United States Patent
Cox et al.

(10) Patent No.: US 8,427,647 B2
(45) Date of Patent: Apr. 23, 2013

(54) CAVITY RING-DOWN SPECTROMETER SYSTEMS

(75) Inventors: James A. Cox, Morristown, NJ (US);
Teresa M. Marta, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 329 days.

(21) Appl. No.: 12/958,142

(22) Filed: Dec. 1, 2010

(65) Prior Publication Data

US 2012/0140220 A1   Jun. 7, 2012

(51) Int. Cl.
*G01N 21/00* (2006.01)

(52) U.S. Cl.
USPC .......................................... 356/437

(58) Field of Classification Search .................. None
See application file for complete search history.

(56) References Cited

U.S. PATENT DOCUMENTS 5,912,740 A    6/1999  Zare et al.
2009/0185175 A1  7/2009  Cole et al.

*Primary Examiner* — Gregory J Toatley
*Assistant Examiner* — Amanda Merlino
(74) *Attorney, Agent, or Firm* — Brooks, Cameron & Huebsch, PLLC

(57) ABSTRACT

Cavity ring-down spectrometer systems are described herein. One or more embodiments include a cavity having at least two mirrors, wherein a first mirror of the at least two mirrors is configured to permit light to enter and exit the cavity, a first detector configured to detect light exiting the cavity through the first mirror, and a second detector configured to detect light from the first mirror, wherein the first detector is separate from the second detector.

19 Claims, 2 Drawing Sheets and exit cavity 110 through a single mirror, e.g., mirror 112. That is, mirror 112 can permit light to enter cavity 110, and mirror 112 can also permit light that has reflected through cavity 110 to exit (e.g., leak out of) cavity 110.
CAVITY RING-DOWN SPECTROMETER SYSTEMS

TECHNICAL FIELD

The present disclosure relates to cavity ring-down spectrometer systems, and methods of operating cavity ring-down spectrometer systems.

BACKGROUND

Spectrometer systems can be used to determine the concentration, e.g., relative amount, of one or more components contained in a mixture. For example, spectrometer systems can be used to determine the concentration of one or more gasses contained in a gaseous mixture. A cavity ring-down spectrometer system is one type of spectrometer system than can be used to determine the concentration of one or more gasses contained in a gaseous mixture.

A cavity ring-down spectrometer system can include a source laser, a cavity having at least two mirrors, and a ring-down detector. The laser can provide light into the cavity through one of the mirrors, and the light can reflect through the cavity and exit (e.g., leak out of) the cavity through one of the mirrors. When the light in the cavity is in resonance, the power and/or intensity of the light in the cavity can increase. The laser can then be turned off, and the rate at which the light exits the cavity (e.g., the rate at which the power and/or intensity of the light exiting the cavity decreases) can be measured by the ring-down detector and used to determine the concentration of one or more gasses contained in a gaseous mixture in the cavity.

The ring-down detector, however, can be saturated by light exiting the cavity before the laser is turned off (e.g., before the cavity passes into resonance). The saturation of the ring-down detector can decrease the range, precision, and/or accuracy of the ring-down detector's subsequent measurement of the rate at which light exits the cavity after the laser is turned off. Accordingly, the saturation of the ring-down detector can decrease the range, precision, and/or accuracy of gas concentrations determined by the cavity ring-down spectrometer system.

DETAILED DESCRIPTION

Cavity ring-down spectrometer systems are described herein. One or more embodiments include a cavity having at least two mirrors, wherein a first mirror of the at least two mirrors is configured to permit light to enter and exit the cavity, a first detector configured to detect light exiting the cavity through the first mirror, and a second detector configured to detect light from the first mirror, wherein the first detector is separate from the second detector.

Ring-down detectors in cavity ring-down spectrometer systems in accordance with one or more embodiments of the present disclosure may not be saturated by light exiting the cavity of the cavity ring-down spectrometer system before the light from the laser of the cavity ring-down spectrometer system is turned off. Accordingly, the range, precision, and/or accuracy of the ring-down detector's subsequent measurement of the rate at which light exits the cavity after the light from the laser is turned off may be greater than saturated ring-down detectors of cavity ring-down spectrometer systems. As such, the range, precision, and/or accuracy of gas concentrations determined by cavity ring-down spectrometer systems in accordance with one or more embodiments of the present disclosure can be greater than the range, precision, and/or accuracy of gas concentrations determined by cavity ring-down spectrometer systems having saturated detectors.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present invention, and should not be taken in a limiting sense.

As used herein, "a" or "a number of" something can refer to one or more such things. For example, "a number of mirrors" can refer to one or more mirrors.

Figure 1:
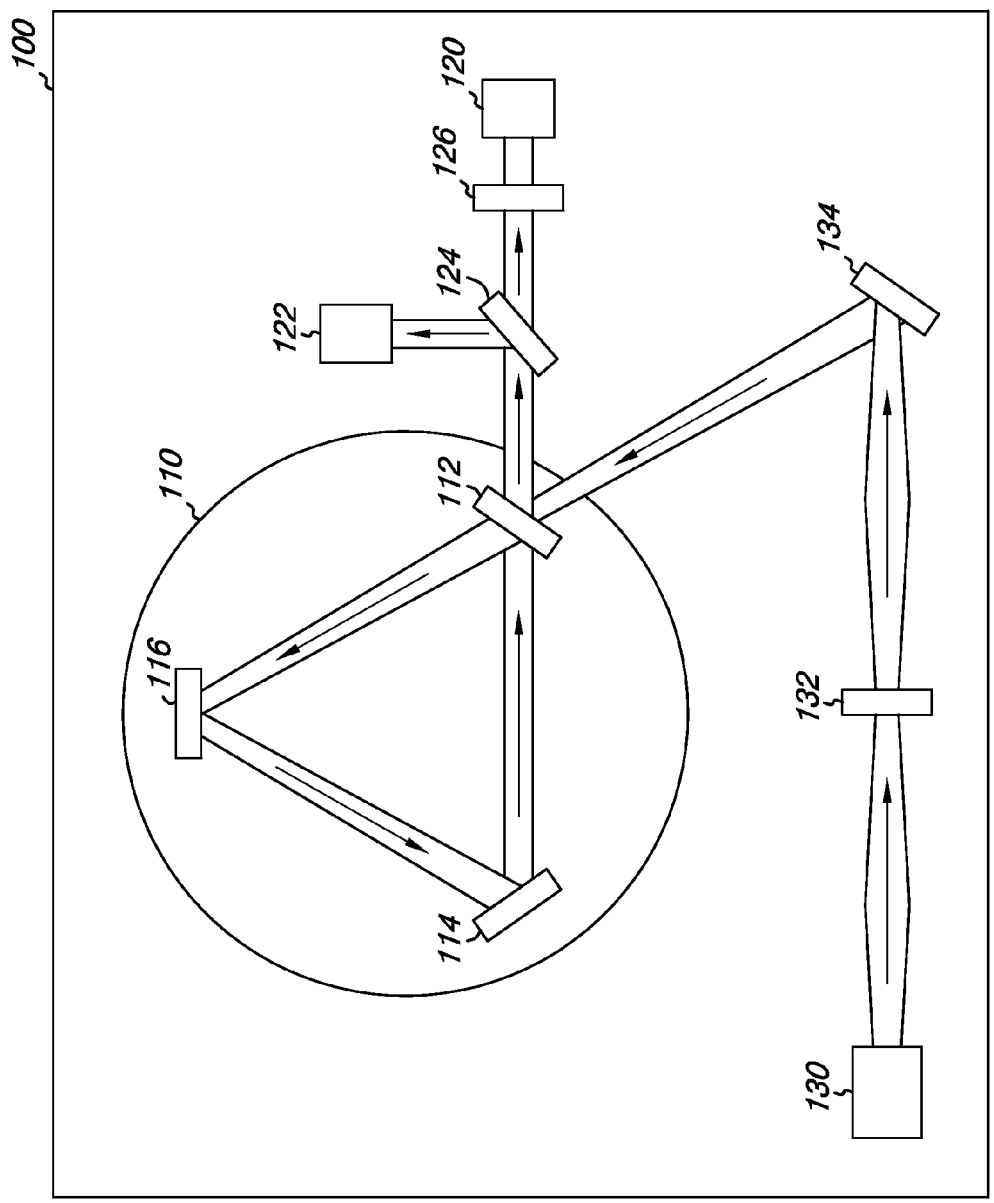
FIG. 1 illustrates a cavity ring-down spectrometer system in accordance with one or more embodiments of the present disclosure.

FIG. 1 illustrates a cavity ring-down spectrometer system 100 in accordance with one or more embodiments of the present disclosure. As shown in FIG. 1, cavity ring-down spectrometer system 100 includes a cavity 110. Cavity 110 can be, for example, a cervit block, among other types of cavities. However, embodiments of the present disclosure are not limited to a particular type of cavity. Cavity ring-down spectrometer system 100 can be used to determine the concentration of one or more gasses contained in a gaseous mixture in cavity 110, as will be further described herein.

As shown in FIG. 1, cavity 110 includes three mirrors 112, 114, and 116. Mirrors 112, 114, and 116 can reflect light (e.g., a laser beam) through cavity 110, as illustrated in FIG. 1. Although the embodiment illustrated in FIG. 1 includes three mirrors, embodiments of the present disclosure are not so limited, and can include any number of mirrors to reflect light through cavity 110.

Mirror 114 can be a movable mirror. For example, mirror 114 can include a piezodrive, which can move mirror 114 approximately 1-2 microns. However, embodiments of the present disclosure are not limited to a particular type of movable mirror. Mirror 114 can be moved as needed to reflect light through cavity 110.

As shown in FIG. 1, light can enter and exit cavity 110 through a single mirror, e.g., mirror 112. That is, mirror 112 can permit light to enter cavity 110, and mirror 112 can also permit light that has reflected through cavity 110 to exit (e.g., leak out of) cavity 110.

As shown in FIG. 1, cavity ring-down spectrometer system 100 includes two detectors 120 and 122. Detector 120 can be separate (e.g., physically separate) from detector 122, as illustrated in FIG. 1. Detector 120 can be a ring-down detector, and detector 122 can be a trigger detector.

Detectors 120 and 122 can detect and/or measure light (e.g., the power and/or intensity of light) exiting cavity 110 through mirror 112, as illustrated in FIG. 1. For example, cavity ring-down spectrometer system 100 includes a beam splitter 124 (e.g., directional couplers, a fiber splitter, etc.) located between (e.g., in the light path between) mirror 112 and detector 120 and between mirror 112 and detector 122, as shown in FIG. 1. Beam splitter 124 can permit light exiting cavity 110 through mirror 112 to reach both detector 120 and detector 122. For instance, beam splitter 124 can direct a portion of the light exiting cavity 110 through mirror 112 to detector 120, and an additional portion of the light exiting cavity 110 through mirror 112 to detector 122.

Detectors 120 and 122 can provide a signal that represents the amount of light incident on detectors 120 and 122. For example, as the light detected and/or measured by detectors 120 and 122 increases, the signal (e.g., the value of the signal) provided by detectors 120 and 122 can increase, and as the power and/or intensity of the light detected and/or measured by detectors 120 and 122 decreases, the signal provided by detectors 120 and 122 can decrease.

As shown in FIG. 1, cavity ring-down spectrometer system 100 includes a shutter 126 located between (e.g., in the light path between) mirror 112 and detector 120 (e.g., between beam splitter 124 and detector 120). Shutter 126 can be, for example, a fast switchable shutter, such as an acousto-optic modulator, fiber attenuator, or optical switch. However, embodiments of the present disclosure are not limited to a particular type of shutter.

Shutter 126 can be turned on and off, as will be described further herein. When shutter 126 is turned on (e.g., opened), shutter 126 can permit light exiting cavity 110 through mirror 112 (e.g., light exiting cavity 110 through mirror 112 that is directed to detector 120 by beam splitter 124) to reach detector 120. When shutter 126 is turned off (e.g., closed), shutter 126 can prevent light reflecting from mirror 112 from reaching detector 120. That is, when shutter 126 is turned on, detector 120 may detect and/or measure light exiting cavity 110 through mirror 112, and when shutter 126 is turned off, detector 120 may not detect or measure light exiting cavity 110 through mirror 112 or reflecting from mirror 112.

As shown in FIG. 1, cavity ring-down spectrometer system 100 includes a source laser 130. Source laser 130 can provide light (e.g., a laser beam) into cavity 110 through mirror 112 via an additional mirror 134, as illustrated in FIG. 1. Source laser 130 can be any type of laser device.

As shown in FIG. 1, cavity ring-down spectrometer system 100 includes a shutter 132 located between (e.g., in the light path between) source laser 130 and mirror 112 (e.g., between source laser 130 and additional mirror 134). Shutter 132 can be, for example, a fast switchable shutter, such as an acousto-optic modulator, fiber attenuator, or optical switch. However, embodiments of the present disclosure are not limited to a particular type of shutter. Additionally, shutter 132 can be the same type of shutter as shutter 126, or shutter 132 can be a different type of shutter than shutter 126.

Shutter 132 can be turned on and off, as will be further described herein. When shutter 132 is turned on, shutter 132 can permit light provided by source laser 130 to enter cavity 110 through mirror 112. When shutter 132 is turned off, shutter 132 can prevent light provided by source laser 130 from entering cavity 110 through mirror 112. Additionally, shutter 132 can operate 180 degrees out of phase with shutter 126. That is, shutter 126 may be off when shutter 132 is on, and shutter 126 may be on when shutter 132 is off, as will be further described herein.

In one or more embodiments of the present disclosure, shutter 132 can be turned on, and shutter 126 can be turned off. Because shutter 132 is turned on, light provided by source laser 130 can enter cavity 110 through mirror 112, reflect through cavity 110, and exit cavity 110 through mirror 112, as previously described herein. Additionally, because shutter 126 is turned off, the light exiting cavity 110 through mirror 112 may reach detector 122, but may not reach detector 120, as previously described herein. That is, light exiting cavity 110 through mirror 112 can be prevented from reaching detector 120 while light provided by source laser 130 enters cavity 110 through mirror 112.

As light provided by source laser 130 continues to enter cavity 110, the light in cavity 110 may come into resonance with cavity 110 and the power and/or intensity of the light in cavity 110 may increase. Accordingly, the power and/or intensity of the light exiting cavity 110 through mirror 112 and reaching detector 122 may also increase.

As the power and/or intensity of the light reaching detector 122 changes, the signal from detector 122 that represents the amount of light incident on detector 122 may also change in the same way. When the signal from detector 122 reaches a threshold value (e.g., when the power and/or intensity of the light detected and/or measured by detector 122 reaches a threshold value), detector 122 can issue a command to shutters 126 and 132 to turn shutter 126 on and turn shutter 132 off. The threshold value can be chosen, for example, to optimize the performance of the gas detection process (e.g., limit of detection, false alarm rate, etc.).

Upon receiving the command issued by detector 122, shutter 126 can turn on (e.g., open), and shutter 132 can turn off (e.g., close). That is, shutter 126 can prevent light exiting cavity 110 through mirror 112 from reaching detector 120 prior to receipt of the command issued by detector 122, and shutter 126 can permit light exiting cavity 110 through mirror 112 to reach detector 120 upon receipt of the command issued by detector 122. Additionally, shutter 132 can permit light provided by source laser 130 to enter cavity 110 through mirror 112 prior to receipt of the command, and shutter 132 can prevent light provided by source laser 130 from entering cavity 110 through mirror 112 upon receipt of the command. That is, light exiting cavity 110 through mirror 112 can reach detector 120 while light provided by source laser 130 is prevented from entering cavity 110 through mirror 112.

Accordingly, after shutter 126 is turned on and shutter 132 is turned off, detector 120 can detect and/or measure light (e.g., the power and/or intensity of light) exiting cavity 110 through mirror 112. For example, detector 120 can detect and/or measure the rate at which light exits cavity 110 through mirror 112, e.g., the rate at which the power and/or intensity of the light exiting cavity 110 through mirror 112 decreases. The detected and/or measured rate can be used to determine the concentration of one or more gasses contained in a gaseous mixture in cavity 110.

Because all light reflected from and/or transmitted by mirror 112 can be prevented from reaching detector 120 while light provided by source laser 130 enters cavity 110 through mirror 112, detector 120 may not be saturated by such light while light provided by source laser 130 enters cavity 110 through mirror 112, e.g., detector 120 may not be saturated by light exiting cavity 110 through mirror 112 as the light in cavity 110 moves into resonance. Because detector 120 may not be saturated by light from mirror 112, the range, precision, and/or accuracy of detector 120's subsequent detection and/or measurement of the rate at which light exits cavity 110 through mirror 112 may be greater than ring-down detectors of cavity ring-down spectrometer systems having saturated detectors. As such, the range, precision, and/or accuracy of gas concentrations determined using cavity ring-down spectrometer system 100 can be greater than the range, precision, and/or accuracy of gas concentrations determined using cavity ring-down spectrometer systems having saturated detectors.

Those of ordinary skill in the art will understand that cavity ring-down spectrometer system 100 can include additional components not illustrated in FIG. 1, but such components are not illustrated so as not to obscure the illustrated components of the present disclosure. For example, cavity ring-down spectrometer system 100 can include one or more lenses between (e.g., in the light path between) source laser 130 and mirror 112 to couple, adjust, and/or translate the light provided by source laser 130 before the light enters cavity 110 through mirror 112, as will be appreciated by one of ordinary skill in the art.

Figure 2:
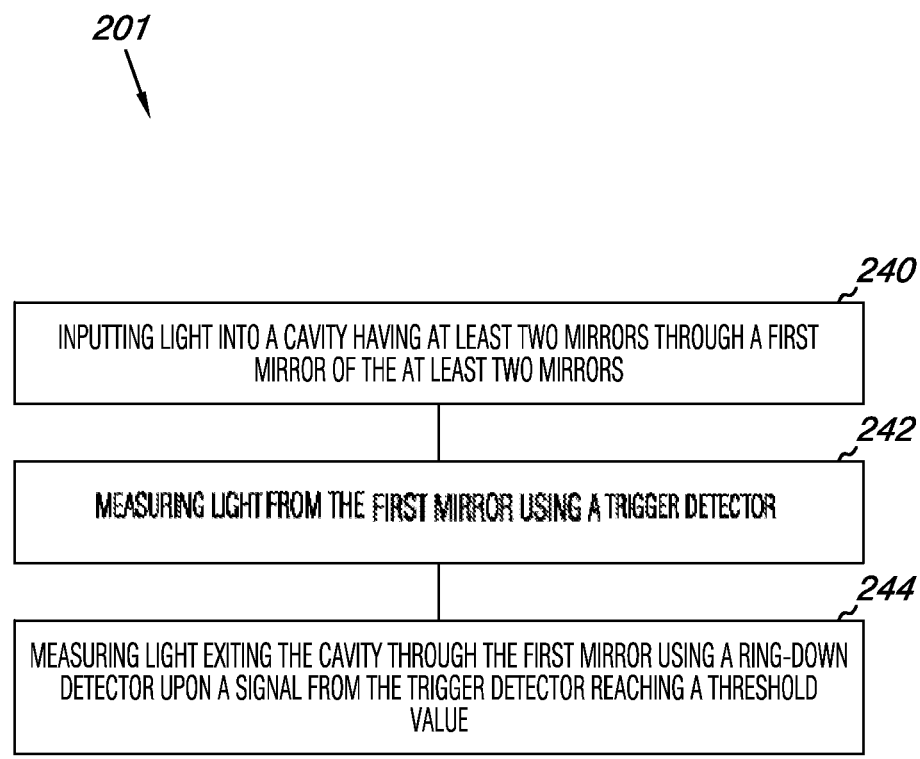
FIG. 2 illustrates a method of operating a cavity ring-down spectrometer system in accordance with one or more embodiments of the present disclosure.

FIG. 2 illustrates a method 201 of operating a cavity ring-down spectrometer system in accordance with one or more embodiments of the present disclosure. The cavity ring-down spectrometer system can be, for example, cavity ring-down spectrometer system 100 previously described in connection with FIG. 1.

At block 240, method 201 includes inputting light into a cavity having at least two mirrors through a first mirror of the at least two mirrors. The cavity can be, for example, cavity 110 previously described in connection with FIG. 1. The mirrors can be, for example, mirrors 112, 114, and/or 116 previously described in connection with FIG. 1, and the first mirror can be, for example, mirror 112.

The light can be provided by a source laser, such as, for example, source laser 130 previously described in connection with FIG. 1. Additionally, the light can be input into the cavity until a signal from a trigger detector (e.g., detector 122 previously described in connection with FIG. 1) reaches a threshold value, as previously described herein.

At block 242, method 201 includes measuring light from the first mirror using a trigger detector. The trigger detector can be, for example, detector 122 previously described in connection with FIG. 1.

At block 244, method 201 includes measuring light exiting the cavity through the first mirror using a ring-down detector upon a signal from the trigger detector reaching a threshold value. The ring-down detector can be, for example, detector 120 previously described in connection with FIG. 1. The threshold value can be, for example, a value that corresponds to a maximum signal to optimum system performance, as previously described herein.

As an example, the light exiting the cavity through the first mirror can be sent to the trigger detector and the ring-down detector using a beam splitter (e.g., beam splitter 124 previously described in connection with FIG. 1), as previously described herein. Further, the ring-down detector can be prevented from measuring light from the first mirror prior to the signal from the trigger detector reaching the threshold value, as previously described herein. Preventing the ring-down detector from measuring light exiting the cavity through the first mirror prior to the signal from the trigger detector reaching the threshold value can prevent saturation of the ring-down detector, as previously described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A cavity ring-down spectrometer system, comprising:
   a cavity having at least two mirrors, wherein a first mirror of the at least two mirrors is configured to permit light to enter and exit the cavity;
   a first detector configured to detect light exiting the cavity through the first mirror;
   a second detector configured to detect light from the first mirror;
   wherein the first detector is separate from the second detector; and a shutter located between the first mirror and the first detector; wherein the shutter is configured to turn on upon a signal from the second detector reaching a threshold value.

2. The cavity ring-down spectrometer system of claim 1, wherein:
   the first detector is a ring-down detector; and
   the second detector is a trigger detector.

3. The cavity ring-down spectrometer system of claim 1, wherein the system includes:
   a source laser configured to provide light into the cavity through the first mirror; and
   an additional shutter located between the source laser and the first mirror, wherein the additional shutter is configured to turn off upon a signal from the second detector reaching a threshold value.

4. The cavity ring-down spectrometer system of claim 1, wherein:
   the system includes a beam splitter located between the first mirror and the first detector and between the first mirror and the second detector; and
   the beam splitter is configured to permit light exiting the cavity through the first mirror to reach the first detector and the second detector.

5. The cavity ring-down spectrometer system of claim 1, wherein a second mirror of the at least two mirrors is a movable mirror.

6. A cavity ring-down spectrometer system, comprising:
   a cavity having three mirrors, wherein a first mirror of the three mirrors is configured to permit light to enter and exit the cavity;
   a ring-down detector and a trigger detector configured to detect light from the first mirror; and
   a shutter located between the first mirror and the ring-down detector, wherein the shutter is configured to permit light exiting the cavity through the first mirror to reach the ring-down detector upon receipt of a command issued by the trigger detector.

7. The cavity ring-down spectrometer system of claim 6, wherein the shutter is configured to prevent light from the first mirror from reaching the ring-down detector prior to receipt of the command issued by the trigger detector.

8. The cavity ring-down spectrometer system of claim 6, wherein the trigger detector is configured to issue the command when a signal from the trigger detector reaches a threshold value.

9. The cavity ring-down spectrometer of claim 6, wherein the system includes:
   a source laser configured to provide light into the cavity through the first mirror; and
   an additional shutter located between the source laser and the first mirror, wherein the additional shutter is configured to prevent light provided by the laser from entering the cavity through the first mirror upon receipt of the command issued by the trigger detector.

10. The cavity ring-down spectrometer of claim 9, wherein the additional shutter is configured to permit light provided by the laser to enter the cavity through the first mirror prior to receipt of the command issued by the trigger detector.

11. The cavity ring-down spectrometer of claim 9, wherein the additional shutter is configured to operate 180 degrees out of phase with the shutter.

12. The cavity ring-down spectrometer of claim 6, wherein:
   the system includes a beam splitter located between the first mirror and the shutter and between the first mirror and the trigger detector; and
   the beam splitter is configured to permit light from the first mirror to reach the shutter and the trigger detector.

13. The cavity ring-down spectrometer of claim 6, wherein the shutter is an acousto-optic modulator.

14. A method of operating a cavity ring-down spectrometer system, comprising:
   inputting light into a cavity having at least two mirrors through a first mirror of the at least two mirrors;
   measuring light from the first mirror using a trigger detector turning on a shutter located between the first mirror and the trigger detector upon a signal from the trigger detector reaching a threshold; and
   measuring light exiting the cavity through the first mirror using a ring-down detector upon the signal from the trigger detector reaching a threshold value.

15. The method of claim 14, wherein the method includes preventing saturation of the ring-down detector.

16. The method of claim 15, wherein preventing saturation of the ring-down detector includes preventing the ring-down detector from measuring light from the first mirror prior to the signal from the trigger detector reaching the threshold value.

17. The method of claim 14, wherein the method includes inputting light into the cavity until the signal from the trigger detector reaches the threshold value.

18. The method of claim 14, wherein the method includes sending light from the first mirror to the trigger detector and the ring-down detector using a beam splitter.

19. The method of claim 14, wherein the signal from the trigger detector represents an amount of light incident on the trigger detector.

* * * * *